June 7, 1966  E. J. HERBENAR ETAL  3,254,898
MULTIPLE LIP SEAL
Filed June 21, 1963
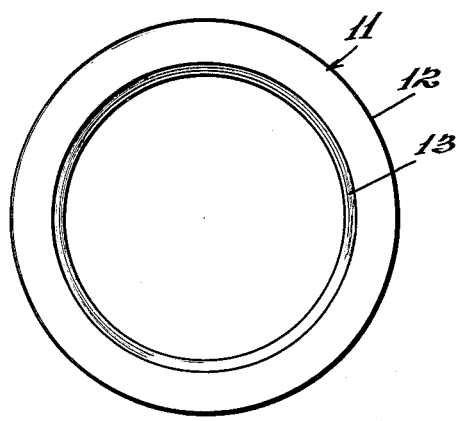
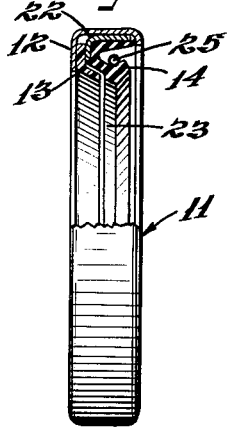
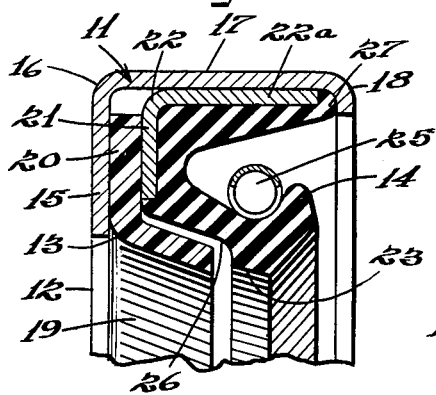
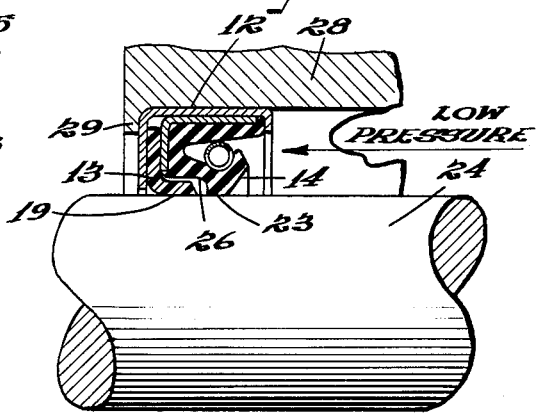
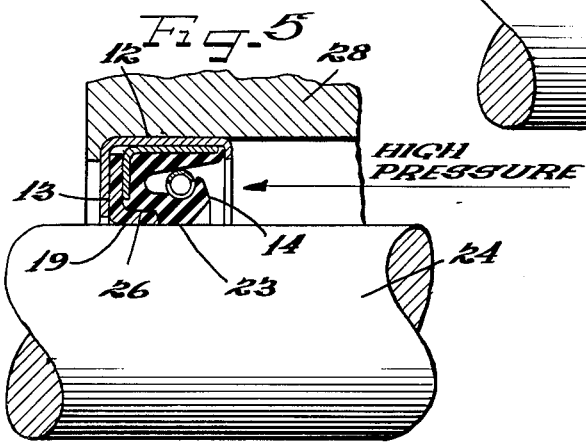
INVENTORS
Edward J. Herbenar
Norman A. Stenzel
ATTORNEYS United States Patent Office 3,254,898
Patented June 7, 1966

3,254,898
MULTIPLE LIP SEAL
Edward J. Herbenar, Detroit, and Norman A. Stenzel, Clawson, Mich., assignors to TRW Inc., a corporation of Ohio
Filed June 21, 1963, Ser. No. 289,582
4 Claims. (Cl. 277—47)

This invention relates to fluid seal constructions for relatively moveable members and more particularly to fluid seal constructions adapted to provide efficient sealing of both high and low pressures around rotary shafts having high shaft surface speeds.

When a high speed rotary shaft must be sealed against leakage over a wide range of pressures it is difficult to effectively seal the shaft at both the high and low pressures without excessive temperature buildup. For example, while conventional rubber lip seals provide satisfactory sealing at low pressures, when the pressure is increased the rubber lip deforms causing gripping of the shaft by the lip which, when combined with a high shaft surface speed acts to develop excessive frictional heat that quickly destroys the sealing lip. Another difficulty results when the sealing lip, because of its flexibility, extrudes along the shaft, thereby permitting fluid leakage past the seal.

Seals having low friction thermoplastic sealing lips have been used on high speed shafts since these plastics withstand very high shaft surface speeds without excessive temperature buildup and subsequent damage therefrom. Also, these plastics are more rigid than the rubber required for flexible lip seals and are able to resist extruding under pressure. However, since such plastics are less resilient than rubber or rubber-like materials, they possess poorer sealing characteristics and consequently require extremely accurate shaft surfaces, excellent surface finishes, and permit very little shaft eccentricity. Thus, both the rubber lip seal and the plastic lip seal have proved to be unsatisfactory for sealing high speed rotary shafts which are subjected to high and low pressures.

The present invention resolves the foregoing problems by providing a combined rubber and low friction plastic lip type rotary shaft seal which correlates the sealing effectiveness of a rubber lip with the rigidity and low friction of a plastic lip.

In accordance with this invention a rubber-plastic lip type rotary shaft seal includes a first or outer seal ring composed of a high temperature resisting, low friction or self lubricating relatively stiff plastic material having an inwardly directly lip which only lightly bears on a shaft under normal pressures. Inboard of this plastic ring there is mounted a softer resilient rubber ring having a lip adapted to ride on the shaft and to effectively form a low pressure seal thereon. In order to control the sealing effectiveness of the rubber lip, a garter-type tension spring surrounding the rubber lip can be provided. The suitable plastics include the polyamides, the polyurethanes, the fluorohydrocarbons and the like such as "Nylon"; "Vulkollan" and "Teflon." The suitable rubbers include low durometer natural vulcanized rubber and synthetics such as "Neoprene," etc.

While the actual construction of the specific seal of this invention may vary, one satisfactory method of construction involves the bonding of an annular casing having an L-shaped cross-section to the outer edge of the rubber ring and press fitting the casing and ring into a second annular casing into which the plastic ring has already been inserted.

In operation, the rubber lip serves as the primary sealing surface under all sealing conditions, whether high or low pressure. Under high pressure conditions however, the rubber ring will deform against the lip of the plastic ring with only the inboard end of the rubber lip bearing on the shaft. This prevents uneven gripping of the rubber lip on the shaft under high sealing pressure and at the same a time places a load on the plastic lip which causes it to be deformed into greater contact with the shaft. Thus, while the contact pressure on the plastic ring is greatly increased, the friction and heat buildup are minimized by reason of the low coefficient of friction of the plastic. Similarly, though the contact pressure of that portion of the rubber lip in contact with the shaft increases, the degree of pressure increase is kept to a minimum by the close support of the plastic lip.

It is therefore an object of the present invention to provide an improved rotary shaft seal.

Another object of the present invention is to provide an improved rotary shaft seal adapted to effectively seal high speed rotary shafts at both low and high pressures without excessive temperature buildup.

A further object of the present invention is to provide an improved rotary shaft seal effective at low pressures which also resists extrusion at high pressures.

A still further object of the present invention is to provide an improved plastic-rubber lip rotary shaft seal adapted to effectively seal high speed rotary shafts at conditions of both high and low pressure.

A yet further object of the present invention is to provide an improved plastic-rubber lip rotary shaft seal wherein the rubber lip is adapted, under conditions of high pressure, to be supportingly received by the plastic lip.

Yet another object of the present invention is to provide an improved plastic-rubber lip rotary shaft seal wherein the rubber lip is adapted to be deflected under conditions of high pressure to deform against the plastic lip and to cause said plastic lip to deform against the shaft.

A specific object of the present invention is to provide a plastic-rubber lip rotary shaft seal wherein the rubber lip is adapted to be deflected, under high pressure conditions, against the plastic lip and to both deflect said plastic lip into sealing engagement with said shaft and to be supportingly received by said plastic lip in order that said rubber lip may be prevented from being unduly deformed under said high pressure.

Other and further objects of this invention will be apparent to those skilled in this art from the following detailed description of the drawings illustrating a preferred structural embodiment of the present invention wherein like reference numerals and characters refer to like and corresponding parts throughout the several views.

On the drawings:

FIGURE 1 is a plan or front face view of the high pressure lip type seal of the present invention;

FIGURE 2 is a side view, with a portion thereof in cross-section, of the high pressure lip type seal of the present invention;

FIGURE 3 is an enlarged fragmentary cross-sectional view of the high pressure lip type seal shown in FIGURE 2;

FIGURE 4 is a quarter view, shown in cross-section, of the high pressure lip type seal of the present invention mounted on a shaft and under conditions of low pressure; and FIGURE 5 is a quarter view, shown in cross-section, of the high pressure lip type seal of the present invention mounted on a shaft and under conditions of high pressure.

As shown on the drawings:

In FIGURES 1, 2 and 3 the reference numeral 11 designates a rotary shaft seal of the present invention having an outer annular metal casing 12 snugly retaining a first or outer sealing ring 13, preferably composed of a relatively rigid plastic such as "Teflon," and a second or inner sealing ring 14 of a more resilient material such as rubber.

The outer annular casing 12 has a radial flange portion 15 extending into a rounded corner portion 16 which in turn extends into a lateral rim 17 that is sized to snugly receive the sealing rings 13 and 14 between the radial flange portion 15 and a crimped or spun inward flange portion 18.

The outer plastic ring 13 has a inner peripheral conical lip 19 and a radial rim 20. The rim 20 is fixedly secured between the flange portion 15 of the outer casing 12 and a smaller flange 21 of an inner annular casing 22 which has a rim 22a press fitted or otherwise secured to the inner periphery of the casing rim 17. The inner casing 22 surrounds the rubber ring 14 and the rubber ring 14 is bonded to both the rim 22a and flange 21 thereof.

The inner resilient ring 14 has a lip 23 which is adapted to sealingly embrace a shaft 24. In order to control the sealing effectiveness of the lip 23 a garter-type tension spring overlying the lip 23 can be provided; however, it should be understood that for some installations such a spring would not be necessary. Adjacent the lip 23 is a conical body portion 26 which is adapted to deform under high pressures and seat on the conical lip 19 of the outer ring 13. A rounded end 27 of the lip 23, sized to sealingly engage the crimped portion 18 of the outer casing 12 provides leak protection between the outer casing 12 and the inner casing 22.

In operation, the rotary shaft seal 11 is inserted on a shaft 24 with the lips 19 and 23 radially compressed and pointed toward the direction of pressure, as is shown in FIGURES 4 and 5. The outer casing 12 is press fitted in a housing 28 containing the shaft 24 and is preferably bottomed against a housing shoulder 29 to insure against leakage around the casing.

Under low pressure conditions the lip 19 of the outer sealing ring 13 lightly bears on the shaft 24 while the resilient lip 23 of the inner ring 14 sealingly engages the shaft 24. Sealing pressure is maintained by the garter spring 25 which applies pressure directly over the contact point of the resilient lip 23 with the shaft 24. The lip 19 of the plastic ring 13 rides on the shaft 24 with very little contact pressure and without significant contact with the resilient lip 23, it does, however, provide dirt exclusion protection for the resilient lip 23 from the side of the seal opposite the medium to be contained. When the pressure is increased, as is shown in FIGURE 5, the resilient ring 14 is deformed with its body portion 26 seating on the lip 19 of the plastic ring 13 which in turn is deformed into greater contact with the shaft 24. The lip 19 furnishes support for the resilient ring 14 thereby minimizing the effect of the high pressure on the resilient ring 14 and preventing uneven gripping of the shaft by the lip 23. Also, while the contact pressure on the plastic lip 19 is greatly increased, the friction and heat buildup is greatly minimized by reason of the low coefficient of friction of the plastic material. The plastic ring 13 and lip 19 thereby function to both support the resilient ring 14 and to provide effective sealing under high pressure conditions.

Although minor modifications might be suggested by those versed in the art, it should be understood that we wish to embody within the scope of the patent warranted hereon all such modifications as reasonably and properly come within the scope of our contribution to the art.

We claim as our invention:

1. A seal for rotary shafts and the like comprising,
an outer sealing ring of a plastic material,
an inner sealing ring of a resilient material,
a rigid outer annular casing having a radial flange portion embracing a rim portion of said outer sealing ring and a lateral rim portion extending from said radial flange portion and terminating in a crimped portion,
said lateral portion being sized to receive the outer sealing ring and inner sealing ring between said radial flange and said crimped portion,
a rigid inner casing bonded to said inner sealing ring and embracing said rim portion of said outer casing and having a flange portion cooperating with said radial flange of said outer casing to rigidly secure said rim portion of said outer sealing ring,
said inner sealing ring having a lip portion sealingly engaging said shaft,
said outer sealing ring having a lip portion embracing said shaft,
said lip portions of the inner and outer sealing rings being spaced and independently supported at low sealing pressures, and
said inner sealing ring being deformable at a predetermined pressure to seat on said lip portion of said outer sealing ring to be supportingly received thereon enabling said lip portion of said inner sealing ring to maintain sealing engagement with said shaft and to deform said lip portion of said outer sealing ring into sealing engagement with said shaft.

2. A multiple shaft seal which comprises,
an annular metal casing having a rim adapted to be press fitted in a shaft housing or the like,
a radially inwardly extending back wall at one end of the rim and an inturned retaining flange at the other end of the rim,
a metal carrier having a rim seated in the rim of the casing and an inturned flange spaced from the back wall of the casing,
a resilient readily deformable rubber primary seal ring bonded in said carrier and overlying the carrier rim in sealed engagement with the casing retaining flange,
said primary seal ring having a flexible body portion sloping away and inwardly from the carrier flange,
a sealing lip on the inner end of the body portion of the primary seal adapted to sealingly engage a shaft extending through the primary seal,
a relatively stiff low friction plastic secondary seal ring having a flange clamped between the back wall of the casing and the flange of the carrier and a sealing lip portion sloping away and inwardly from the back wall of the casing adapted to sealingly engage a shaft also engaged by the primary seal ring,
said sealing lip portion of the secondary seal ring underlying the flexible body portion of the primary seal ring and adapted to support said body portion under high pressures to prevent high friction loading of the primary seal ring on the shaft while being urged by said body portion against the shaft.

3. A multiple lip seal for rotary shafts having low and high pressures acting thereon comprising,
a primary ring of a resilient material having a lip portion formed thereon and supported thereby embracing a shaft portion to be sealed,
said lip being deformable from a free state configuration to a first configuration when a low pressure is acting thereon and then to a second configuration when a high pressure is acting thereon, and
a secondary ring of a more rigid material adjacent said primary ring and having a lip portion formed thereon and supported thereby independently of the lip portion of said primary ring and having an inner diameter substantially the same as the inner diameter of said lip portion of said primary ring,
said lip portions having mating surfaces formed thereon facing each other,
in the free state and in the first configuration of said primary ring said mating surfaces being situated in spaced relation with one another with a gap therebetween and in the second configuration of said primary ring said mating surface of said lip portion thereof being adapted to be moved into abutting engagement with said mating surface of said lip portion of said secondary ring to be supporting received thereby and to urge said lip portion of said secondary ring into greater contact with the shaft, said lip portions of both of said rings being in engagement with the shaft when the primary ring is in the first and in the second configurations thereof.

4. The multiple lip seal as defined in claim 3 and including a tension spring overlying said lip portion of said primary ring urging said lip portion into sealing engagement with said shaft portion.

References Cited by the Examiner

UNITED STATES PATENTS

| 2,386,873 | 10/1945 | Mercier | 277—176 |
| 2,804,325 | 8/1957 | Riesing | 277—153 |
| 3,099,454 | 7/1963 | Walinske | 277—47 |

FOREIGN PATENTS

| 237,512 | 2/1962 | Australia. |

LAVERNE D. GEIGER, *Primary Examiner.*

SAMUEL ROTHBERG, *Examiner.*